(12) United States Patent
Gardiner et al.

(10) Patent No.: US 8,505,309 B2
(45) Date of Patent: Aug. 13, 2013

(54) SYSTEMS AND METHODS FOR IMPROVING THE EFFICIENCY OF A COMBINED CYCLE POWER PLANT

(75) Inventors: Barrett Gardiner, Schecnectady, NY (US); Brett Thompson, Greenville, SC (US); Aaron Vorel, Greenville, SC (US); Kihyung Kim, Greenville, SC (US); Ricky Conard, Greenville, SC (US)

(73) Assignee: General Electric Company, Schenectady, NY (US)

( * ) Notice: Subject to any disclaimer, the term of this patent is extended or adjusted under 35 U.S.C. 154(b) by 35 days.

(21) Appl. No.: 13/159,657

(22) Filed: Jun. 14, 2011

(65) Prior Publication Data

US 2012/0317988 A1    Dec. 20, 2012

(51) Int. Cl.
 *F02C 6/00* (2006.01)
(52) U.S. Cl.
 USPC ......... 60/775; 60/39.511; 60/39.182; 60/736; 60/728
(58) Field of Classification Search
 USPC ................. 60/39.511, 773, 778, 39.182, 793, 60/39.24, 775, 736, 728
 See application file for complete search history.

(56) References Cited

U.S. PATENT DOCUMENTS

| | | | | |
|---|---|---|---|---|
| 3,150,487 A * | 9/1964 | Mangan et al. | ............ | 60/39.182 |
| 4,267,692 A * | 5/1981 | Earnest | ....................... | 60/39.181 |
| 5,491,971 A * | 2/1996 | Tomlinson et al. | ......... | 60/39.182 |
| 6,145,295 A * | 11/2000 | Donovan et al. | ................. | 60/783 |
| 6,244,035 B1 * | 6/2001 | Krill | .............................. | 60/783 |
| 7,644,573 B2 | 1/2010 | Smith et al. | | |
| 2008/0098891 A1 | 5/2008 | Feher et al. | | |
| 2008/0243352 A1 | 10/2008 | Healy | | |
| 2008/0298957 A1 | 12/2008 | Chillar et al. | | |
| 2009/0235634 A1 | 9/2009 | Wang et al. | | |
| 2010/0010209 A1 | 1/2010 | Foote | | |
| 2010/0131169 A1 | 5/2010 | DiAntonio et al. | | |
| 2010/0146930 A1 | 6/2010 | Motakef et al. | | |
| 2010/0146976 A1 | 6/2010 | Motakef et al. | | |
| 2010/0146978 A1 | 6/2010 | Feher et al. | | |
| 2010/0146981 A1 | 6/2010 | Motakef et al. | | |

* cited by examiner

*Primary Examiner* — William H Rodriguez
*Assistant Examiner* — Steven Sutherland
(74) *Attorney, Agent, or Firm* — Nixon & Vanderhye P.C.

(57) ABSTRACT

Systems and methods for improving the efficiency of a power generation facility utilize heat energy to preheat inlet-air that is supplied to the compressor of a turbine or to preheat fuel that is burned in the turbine. The heat energy used to preheat the inlet-air can be drawn from a heat recovery steam generator (HRSG) that produces steam using at least part of the exhaust gas of the turbine. The heat energy can be obtained from one or more predetermined points within the HRSG, such as a feed water line exiting a drum of the HRSG or a feed line connecting an economizer of the HRSG to a drum of the HRSG. The fluid drawn from the predetermined point passes through a heat exchanger or a preheater to remove the heat energy used for preheating. The fluid is then returned to the HRSG immediately downstream from the point from which it was drawn.

12 Claims, 6 Drawing Sheets

SYSTEMS AND METHODS FOR IMPROVING THE EFFICIENCY OF A COMBINED CYCLE POWER PLANT

BACKGROUND OF THE INVENTION

The invention relates to systems and methods for improving the efficiency of a power generating facility that utilizes a turbine.

Turbomachines, such as gas turbines, aero-derivatives, or the like, commonly operate in a combined-cycle and/or cogeneration mode. In combined-cycle operation, a gas turbine is connected to a generator that produces electricity. A heat recovery steam generator (HRSG) receives at least a portion of the exhaust gas produced by the gas turbine, and the HRSG uses the heat energy in the exhaust gas to generate steam. The steam produced by the HRSG flows to a steam turbine connected to another generator which produces additional electricity. In a co-generation operation, a portion of the steam generated by the HRSG is sent to a separate process requiring the steam.

Combined-cycle and cogeneration plants are rated to generate the maximum amount of energy (mechanical, electrical, etc) at minimum fuel consumption while operating at base load. However, if possible, it is desirable to improve the efficiency of the system when operating at base load.

Base load operations, although desired by operators, is not always feasible. There may not be a demand in the energy market (electrical grid, or the like) for all of the energy generated at base load. In these situations, the power plant either must shutdown or operate at part load, where less than the maximum amount of energy is generated. When a turbine in such a power generation facility is operating at part load, the overall efficiency of the system is typically lower than when the turbine is operating at base load. Thus, there is a need to improve the efficiency of the system when operating under part load conditions.

Gas turbines are typically required to maintain emissions compliance while generating power. A gas turbine operating at part load may not maintain emissions compliance if it is running below a particular load point. The "turndown range" is the loading range where the gas turbine maintains emissions compliance. A broad turndown range allows operators to maintain emissions compliance, minimize fuel consumption, and avoid the thermal transients associated with shutting down the power plant under a broad range of electricity output conditions. Thus, it is desirable to make the turndown range as broad as possible.

When it is desirable to make changes to an existing power plant to increase efficiency, any retrofit solutions should preferably minimize modifications to existing equipment. This is desirable both from a cost perspective, and also to avoid negatively impacting plant operability. Further, any retrofit changes should not increase operation or maintenance costs, otherwise the retrofit changes may not be economically worthwhile.

For all the foregoing reasons, there is a need for a system for improving the efficiency of a power generation facility that is operating at either base load or part load conditions. There is also a need for a system for improving the turndown range of gas turbines. However, any changes made to achieve a higher efficiency or to increase turndown range should not significantly impact other plant operations or maintenance requirements. Otherwise the improvements in efficiency and/or turndown range may be outweighed by higher operating or maintenance costs, or reduced efficiency during other operating conditions.

BRIEF DESCRIPTION OF THE INVENTION

In one aspect, the invention can be embodied in a system for improving the efficiency of a power generation facility. The system includes a turbine comprising a compressor which receives inlet-air, a combustion system and a turbine section, wherein the turbine produces an exhaust-gas. The system also includes a heat recovery steam generator (HRSG) which receives a portion of the exhaust-gas and produces steam. The system also includes a preheater that obtains heat energy from the HRSG and that uses that heat energy to improve the efficiency of the power generation facility, wherein the heat energy obtained from the HRSG is obtained from a fluid drawn from a predetermined point within the HRSG, and wherein after heat energy has been extracted from the fluid, the fluid is returned to the HRSG at the predetermined point.

In another aspect, the invention can be embodied in a method of improving the efficiency of a power generation facility that includes a turbine having a compressor which receives inlet-air, a combustion system and a turbine section, the turbine producing an exhaust-gas that is at least partially provided to a heat recovery steam generator (HRSG). The method includes drawing fluid from a predetermined point within the HRSG, obtaining heat energy from the fluid, using the obtained heat energy to improve the efficiency of the power generation facility, and returning the fluid to the predetermined point within the HRSG after heat energy has been obtained from the fluid.

DETAILED DESCRIPTION OF THE INVENTION

The following detailed description of preferred embodiments refers to the accompanying drawings, which illustrate specific embodiments of the invention. Other embodiments having different structures and operations do not depart from the scope of the present invention.

The present invention may be applied to a wide variety of turbomachines including, but not limited to, gas turbines, aero-derivative combustion turbines, and the like. An embodiment of the present invention takes the form of an application and process that extracts heat energy from a source other than the turbomachine and that uses that heat energy to increase the efficiency of the turbomachine when the turbomachine is operating at part load conditions. The extracted heat energy could be used to heat the air entering a turbomachine, to heat fuel that is burned in the turbomachine, or for other purposes. An embodiment of the present invention has the technical effect of improving the efficiency of a power generation facility when the facility is operating under part load conditions.

Figure 1:
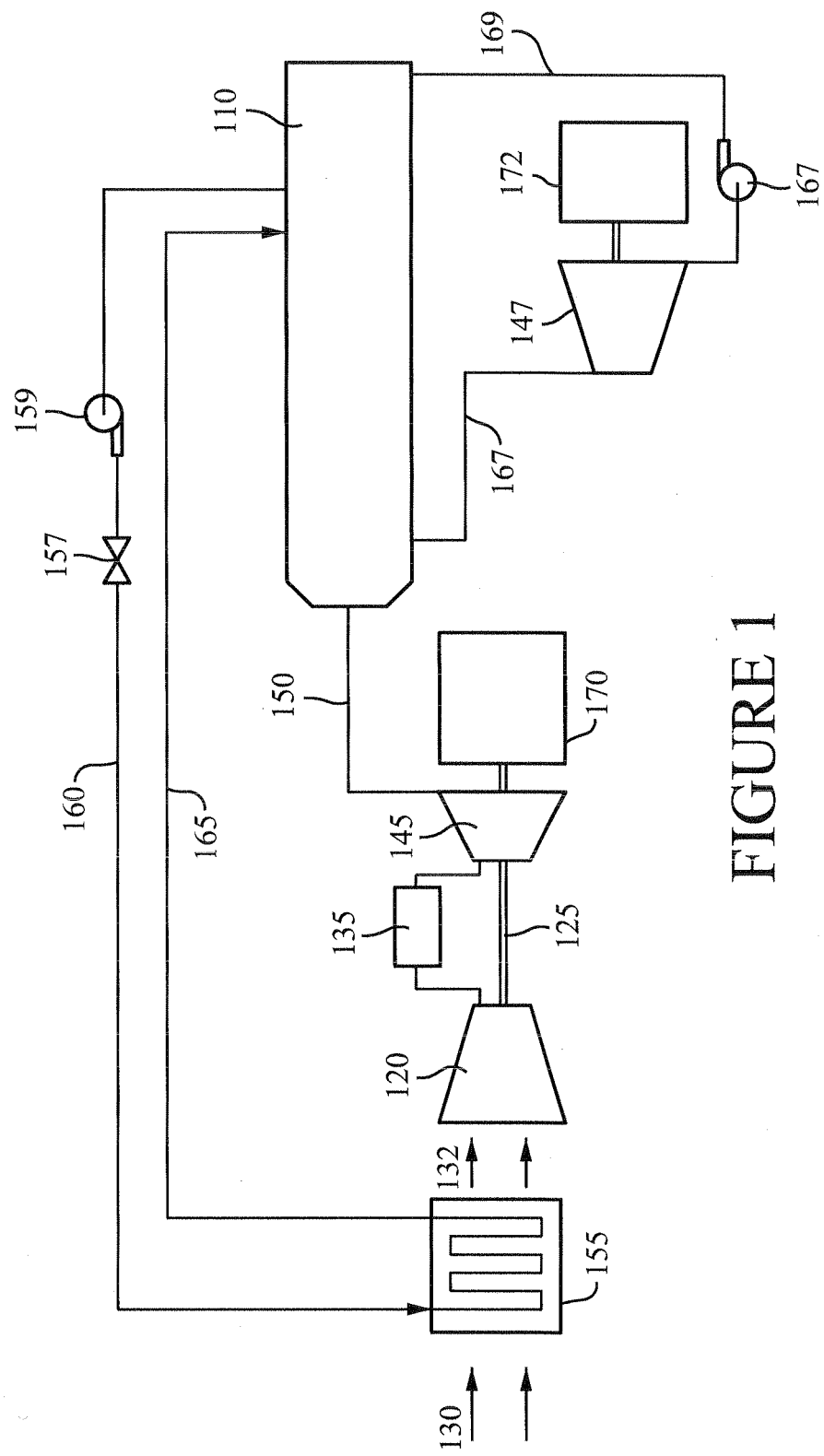
FIG. 1 is a diagram of elements of a first embodiment of a combined cycle power plant.

FIG. 1 illustrates a system designed for combined-cycle operations. The system includes a gas turbine that includes an axial flow compressor 120 having a shaft 125. Inlet-air 132 enters the compressor 120 where it is compressed and then discharged to a combustion system 135. In the combustion system 135, the compressed air is mixed with a fuel such as natural gas, and the air-fuel mixture is burned to provide high-energy combustion gases which drive a turbine section 145. In the turbine section 145, the energy of the combustion gases is converted into work, some of which is used to drive the compressor 120 through the shaft 125. The turbine also drives a generator 170 that produces electricity.

A portion of the exhaust gases produced by the turbine is routed to a heat recovery steam generator (HRSG) 110. The HRSG uses heat energy in the exhaust gases from the turbine to produce steam which is routed to a steam turbine 147 through a steam line 167. The steam turbine 147 is connected to a generator 172 that also produces electricity. The steam exiting the steam turbine 147 is condensed in a surface condenser and is pumped by a condensate pump 167 back to the HRSG via a return line 169.

The present invention can improve the efficiency of the system when the turbine is operating at part load conditions by heating the inlet-air flowing into the compressor 120. Generally, the output (electrical, mechanical, or the like) of a gas turbine is governed by the amount of mass-flow entering the compressor 120. The mass-flow may be considered the product of the density and the volume-flow of the inlet-air 132 entering the compressor 120. The amount of volume-flow entering the compressor 120 may vary based on the compressor inlet temperature conditions and the angle of variable Inlet Guide Vanes (IGV), if present, on the gas turbine. The IGV angle may determine the flow area at the inlet of the compressor 120. The IGV angle may be reduced to a minimum angle, limiting the amount of turndown. At the minimum IGV angle, a corresponding minimum volume-flow is drawn into the compressor 120.

In systems and methods embodying the present invention, heating of the inlet-air 132 decreases the density of the air flowing into the compressor 120. As discussed, the output of the gas turbine may be determined by the mass-flow entering the gas turbine. At a given load point, the mass-flow may remain almost constant, but the volume-flow entering the compressor 120 increases due to the decrease in the density of the inlet air 132. Thus, heating of the inlet air opens the inlet guide vane angle to maintain constant mass-flow, and as a result, the efficiencies of the compressor and turbine are increased. Heating of the inlet air can also allow the turbine to operate at a lower setting than would be possible without inlet heating, which increases the turndown range.

The embodiment illustrated in FIG. 1 includes a preheater 155 that is installed upstream of the compressor 120. The preheater 155 may be a heat exchanger, or the like. The preheater 155 receives ambient air 130 and produces heated inlet-air 132 that flows into the compressor 120 of the turbine.

Of course, during base load operations no preheating would be required. Under those conditions, the ambient air 130 would simply flow through the preheater 155 and into the compressor 120. However, when it is desirable to operate at less than base load, the preheater 155 is used to preheat the inlet-air 132 to achieve the benefits described above.

Generally, the temperature of the unheated inlet-air 130 may be determined by the ambient conditions or the outlet temperature of any air conditioning system (not illustrated) located upstream of the air preheater 155. An embodiment of the present invention may increase the temperature of the ambient air 130 to any temperature allowed for by the preheater 155. However, the increase in temperature of the ambient air 130 may be limited by at least one of several factors. For instance, the amount by which the ambient air can be heated may be limited by the geometrical limitations of the air preheater 155, a temperature that may violate a thermal, operational, or mechanical limitation, or the amount of heat energy available to the preheater 155 for heating the ambient air 130.

In the system illustrated in FIG. 1, the preheater 155 receives a flow of fluid from the HRSG 110 through a supply line 160. The fluid travels through the preheater and is then returned to the HRSG 110 through a return line 165. A pump 159 is used to cause the fluid to flow from the HRSG 110 to the preheater 155 and back to the HRSG 110. The pump 159 could be a variable speed pump or a constant speed pump. A control valve 157 can be used to control the flow of fluid to the preheater. By varying the amount of fluid flowing to the preheater 155, one can control the degree to which the inlet air is heated before it enters the compressor. If the pump is a constant speed pump, the control valve 157 could be a three way control valve that is also connected to a bypass circuit.

The source of the fluid flowing through the supply line 160, the preheater 155 and the return line 165 is discussed in detail below. However, the temperature of the fluid is higher than the temperature of the ambient air 130. As a result, circulation of the fluid through the preheater 155 raises the temperature of the ambient air 130 to generate heated inlet-air 132 that is supplied to the compressor 120.

Figure 2:
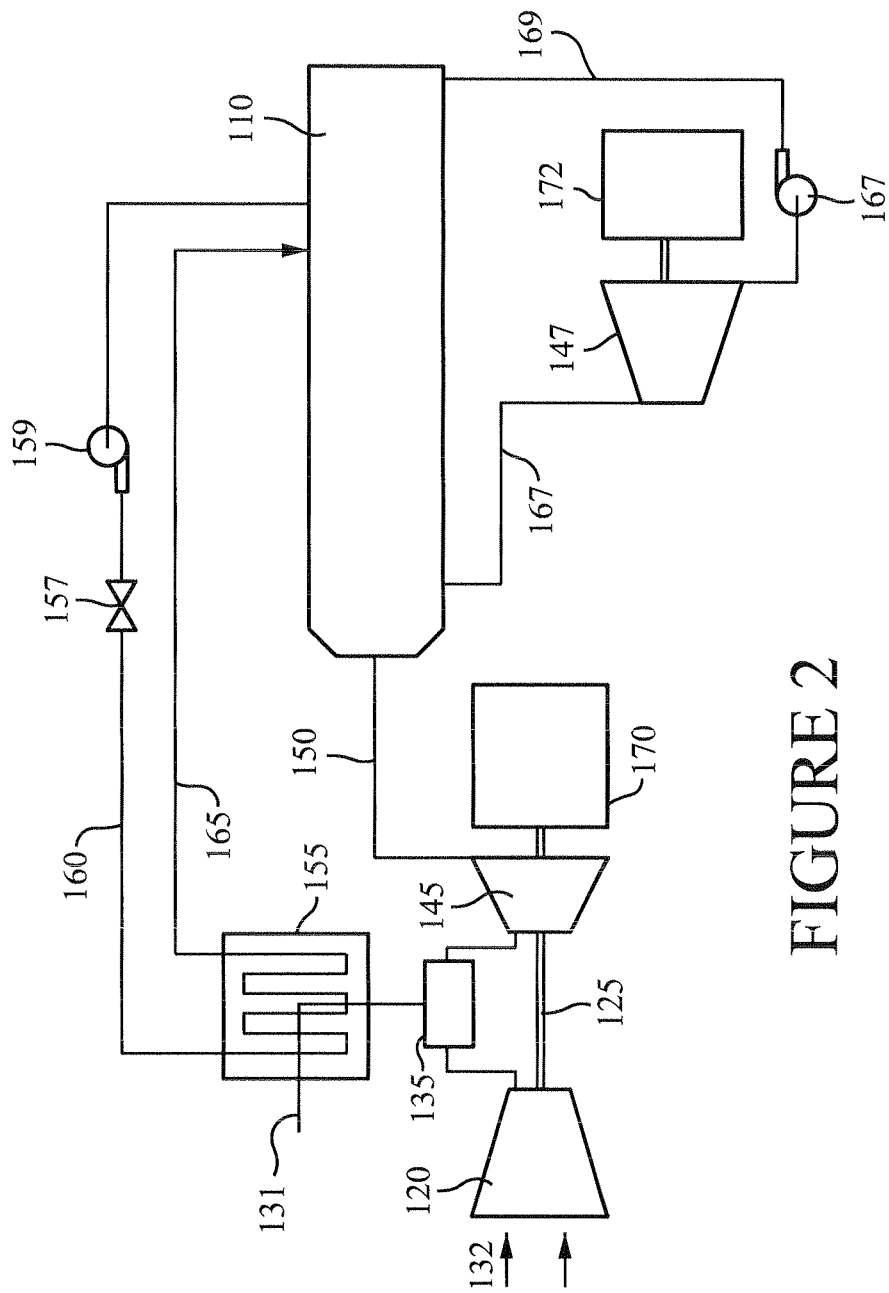
FIG. 2 is a diagram of elements of a second embodiment of a combined cycle power plant.

FIG. 2 illustrates a second embodiment which includes a preheater that heats fuel being burned in the turbine. In this embodiment, a preheater 155 receives fuel from a fuel supply line 131 and a flow of fluid from the HRSG 110 through a supply line 160. The fluid circulates through the preheater and is then returned to the HRSG 110 through a return line 165. A pump 159 is used to cause the fluid to flow from the HRSG 110 to the preheater 155 and back to the HRSG 110. The pump could be a constant speed pump or a variable speed pump. A control valve 157 may be used to control the amount of fluid being routed to the preheater 155, and thus the amount of preheating that occurs. The control valve could be a three way valve that is also coupled to a bypass circuit.

The preheater utilizes heat energy from the fluid flowing through the supply line 160 to preheat the fuel being supplied to the turbine. The preheating of the fuel can increase the efficiency of the turbine, and thus the efficiency of the overall system.

Figure 3:
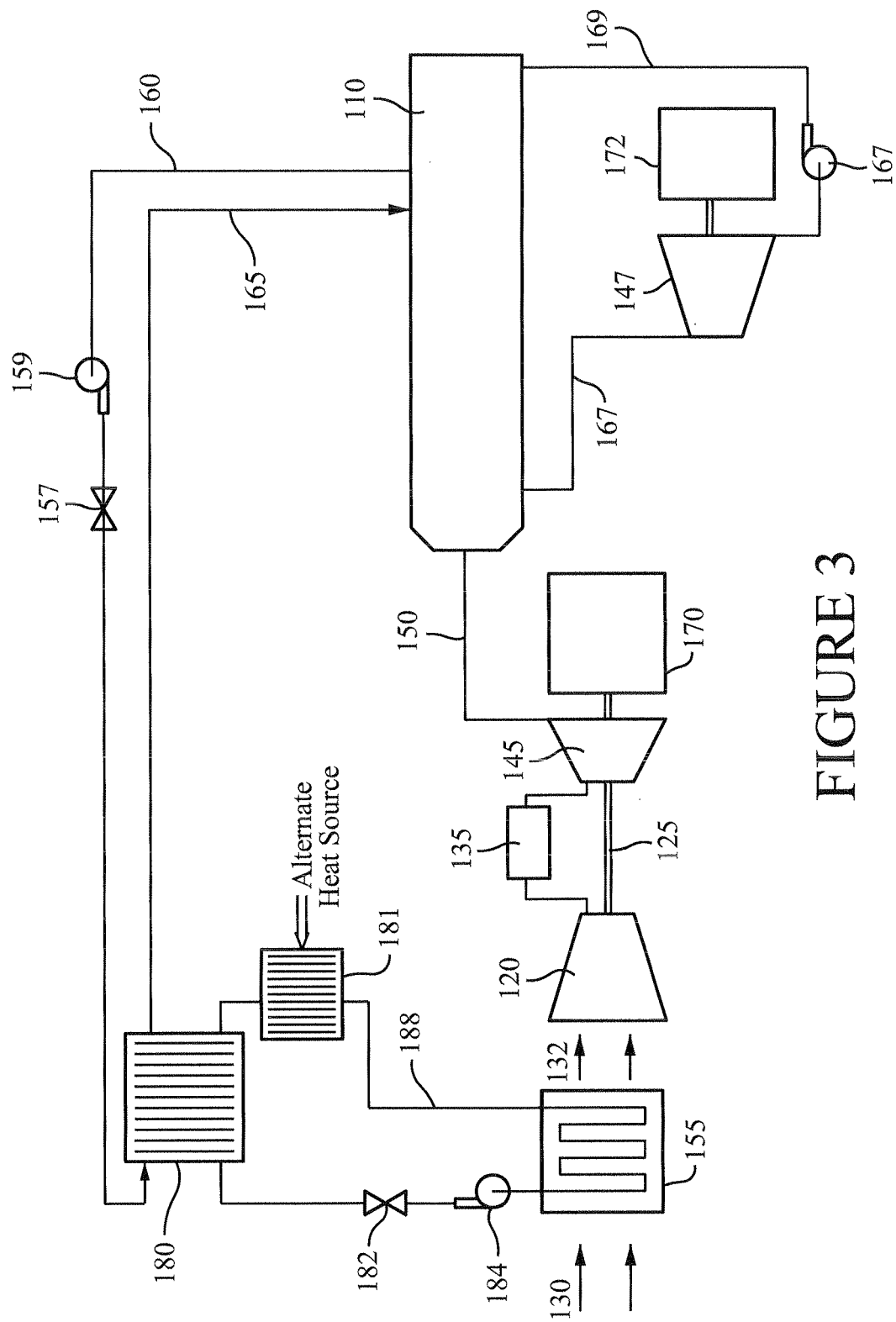
FIG. 3 is a diagram of elements of a third embodiment of a combined cycle power plant.

FIG. 3 illustrates an alternate embodiment. In this embodiment, fluid drawn from the HRSG 110 and flowing through the supply line 160 is routed through a heat exchanger 180. The fluid then exits the heat exchanger 180 and is returned to the HRSG 110 by the return line 165.

A heat transfer medium flows from the heat exchanger 180 through a supply line 188 into the preheater 155. The heat transfer medium is circulated from the preheater 155 back to the heat exchanger 180 by a circulation pump 184. A three-way control valve 182 is used to control the flow of the heat transfer medium.

When the fluid from the HRSG 110 is circulating through the heat exchanger 180, and the heat transfer medium is circulating between the heat exchanger 180 and the preheater 155, heat energy in the fluid drawn from the HRSG is transferred to the heat transfer medium in the heat exchanger 180. This heat energy is then transferred to the ambient air 130 to create the heated inlet-air 132 in the preheater 155. With a system as illustrated in FIG. 3, the fluid drawn from the HRSG 155 can be kept completely separate from the heat transfer medium flowing through the preheater 155. This allows a separate fluid with a lower freezing point to be used as the heat transfer medium, which provides system freeze protection and improves the system operating range and availability.

The heat transfer medium can be any fluid, liquid or gas. For example, the heat transfer medium could be water, ethylene glycol, or mixtures of those fluids. Any other suitable fluid, liquid or gas could also be used.

The amount of heat that is transferred to the inlet air can be controlled by controlling a flow rate of the fluid from the HRSG through the heat exchanger 180. The flow rate could be controlled via a variable speed pump. Alternatively, if the pump is a constant speed pump, the control valve could be a three-way control valve 157 that allows a selected portion of the fluid to bypass the heat exchanger 180 via a bypass circuit.

The amount of heat transferred to the inlet air can also be controlled by controlling the flow rate of the heat exchange medium through the heat exchanger 180 and preheater 155. Here again, the pump 184 could be a variable speed pump to provide control over the flow rate. Alternatively, the pump 184 could be a constant speed pump, and a three-way control valve 182 coupled to a bypass circuit could be used to control the flow rate of the heat exchange medium.

FIG. 3 also illustrates that an alternate or auxiliary heat exchanger 181 may also be coupled to the lines carrying the heat transfer medium. The auxiliary heat exchanger would utilize some other source of heat, such as a plant auxiliary cooling system, to heat the heat transfer medium. That heat energy would then be used to pre-heat the inlet air flowing into the compressor 120. The auxiliary heat exchanger 181 could be used alone, or in conjunction with the heat exchanger 180 to heat the heat transfer medium.

The systems illustrated in FIGS. 1 and 2 could also make use of the same type of auxiliary heat exchanger. However, the auxiliary heat exchanger would be coupled to the inlet line 160 passing from the HRSG 110 to the preheater 155.

Figure 4:
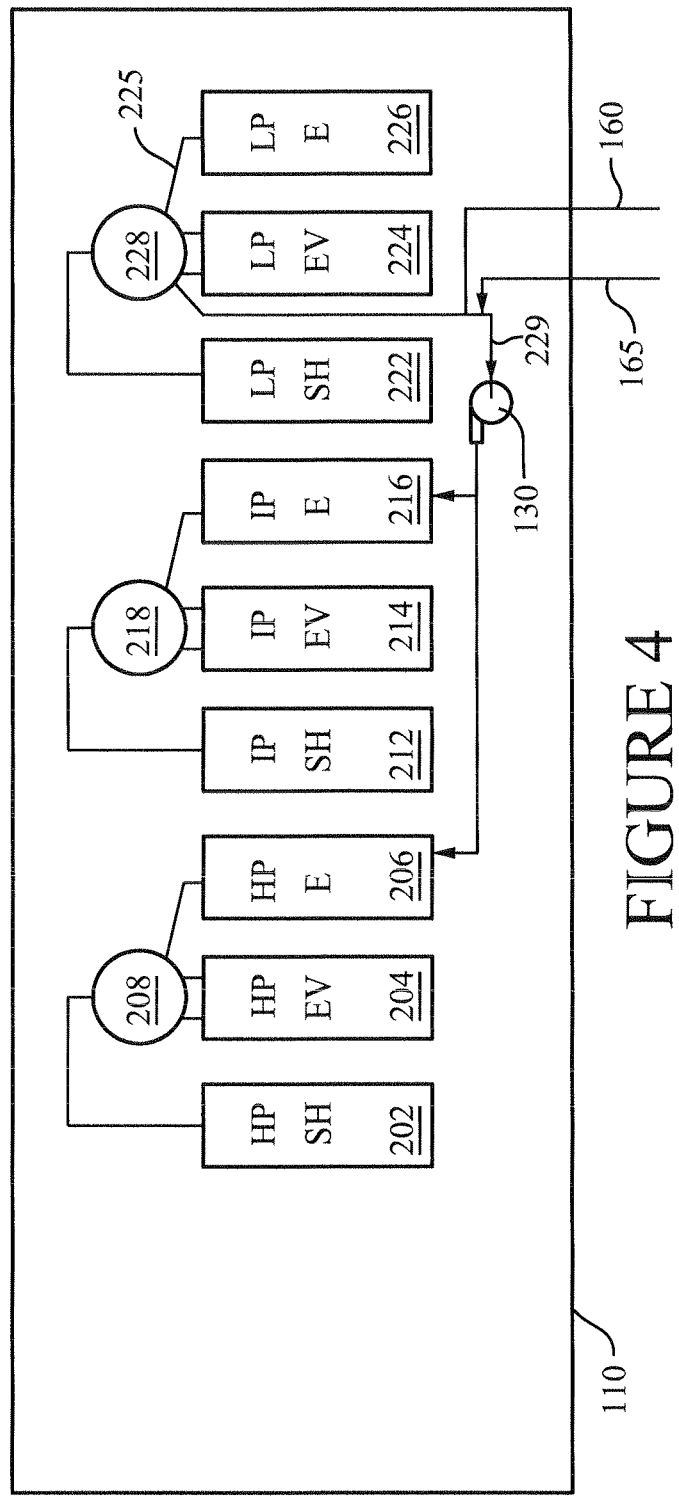
FIG. 4 is a diagram of elements of a first embodiment of a heat recovery steam generator that could be used in a combined cycle power plant.

FIG. 4 illustrates portions of a HRSG 110 that could be used in the systems illustrated in FIGS. 1-3. The HRSG 110 includes high pressure, intermediate pressure and low pressure stages.

The high pressure stage includes a high pressure superheater 202, a high pressure evaporator 204 that generates steam collected in a high pressure drum 208, and a high pressure economizer 206 coupled to the high pressure drum 208.

Likewise, the intermediate pressure stage includes an intermediate pressure superheater 212, an intermediate pressure evaporator 214 that generates steam collected in an intermediate pressure drum 218, and an intermediate pressure economizer 216 coupled to the intermediate pressure drum 218.

The low pressure stage includes a low pressure superheater 222, a low pressure evaporator 224 that generates steam collected in a low pressure drum 228, and a low pressure economizer 226 coupled to the low pressure drum 228 through a feed line 225. Also, condensate from the low pressure drum 228 passes along a boiler feed water line 229 to a feed water pump 130. The feed water pump 130 sends the condensate to the intermediate pressure economizer 216 and the high pressure economizer 206.

Although the above description applies to a typical HRSG, an individual HRSG may have fewer than all described components, or many additional components. The above description is only illustrative to help explain the thermal integration of the heat energy between the HRSG 110 and the preheater 155 or heat exchanger 180.

In the embodiment illustrated in FIG. 4, the fluid supply line 160 that runs to the preheater 155 in the system illustrated in FIGS. 1 and 2 or the heat exchanger 180 in the system illustrated in FIG. 3 is connected to the feed water line 229 between the low pressure drum 228 and the feed water pump 130. Also, the return line 165 that returns fluid to the HRSG 110 is connected to the same feed water line 229 just downstream from the position where the supply line 160 is connected.

Figure 5:
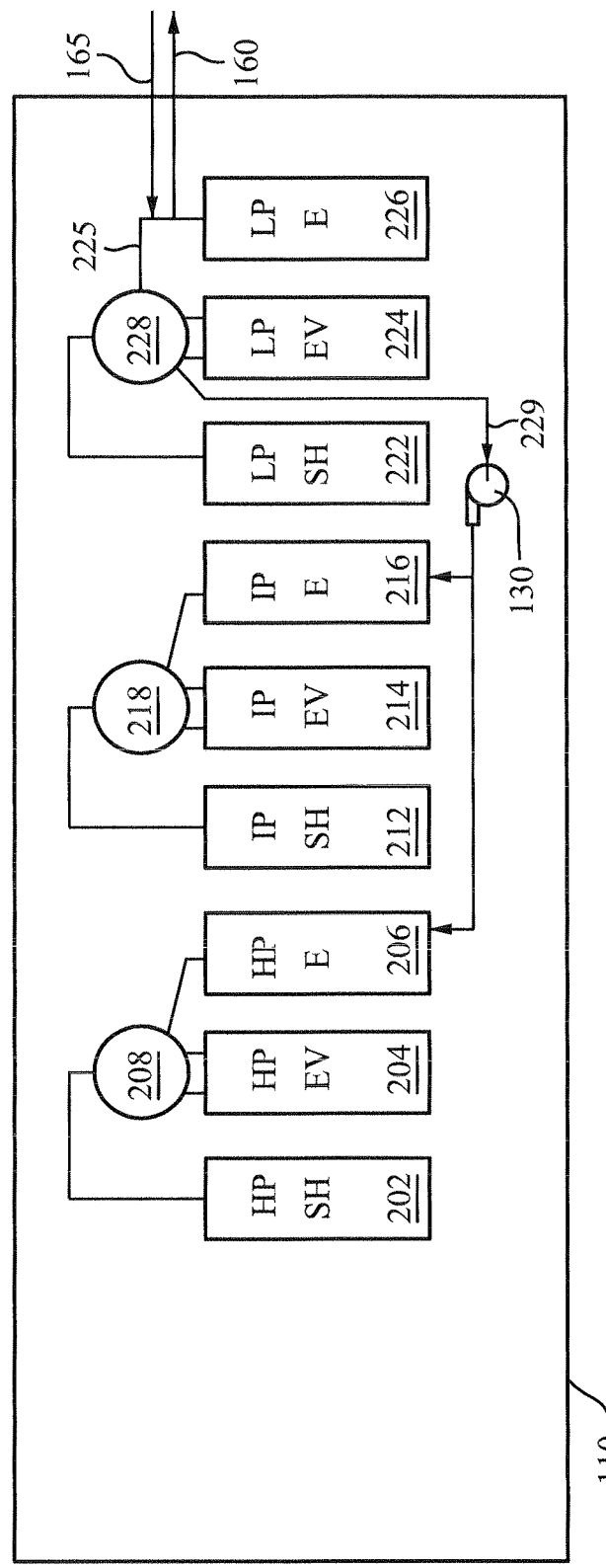
FIG. 5 is a diagram of elements of a second embodiment of a heat recovery steam generator that could be used in a combined cycle power plant.

In an alternate embodiment illustrated in FIG. 5, the supply line 160 is connected to the feed line 225 between the low pressure economizer 226 and the low pressure drum 228. The return line 165 is also connected to the feed line 225 just downstream from the position where the supply line 160 is connected.

Fluid drawn from either the feed water line 229 or the feed line 225 of the HRSG 110 has a sufficiently high temperature to be used to heat ambient air 130 to produce heated inlet air 132 supplied to the compressor 120. Also, using fluid drawn from either of these two lines has other advantages.

The HRSG in an existing power plant will have been designed to operate within a particular environment. The operating temperatures of the steam and the fluids, the flow rates, the water levels in the high, intermediate and low pressure drums and various other factors are part of the design of the HRSG. If an inlet-air preheating system as described above is retrofitted into an existing power plant, removing heat energy from the HRSG for use in a preheater may negatively impact the operation and efficiency of the HRSG itself, as well as any components that utilize the steam produced by the HRSG, such as the steam turbine 172 illustrated in FIGS. 1-3.

Removing heat energy from the fluids running through the low pressure portions of the HRSG is likely to minimize the performance penalty to the steam cycle, and thus any components that reply upon the steam produced by the HRSG, as compared to extracting heat from fluids drawn from the intermediate or high pressure portions of the HRSG. This is also likely to minimize the impact to operation of the HRSG. Nevertheless, under certain situations, such as where a higher temperature fluid is required, it may make sense to extract heat from fluids drawn from the intermediate or high pressure portions of the HRSG.

One can also minimize the impact to the HRSG by returning a fluid used for heat energy back to the same location in the HRSG from which it was extracted. Thus, in the embodiment illustrated in FIG. 4, the fluid return line 165 is connected to the feed water line 229 at a location just downstream of the point at which the supply line 160 is connected. Likewise, in the embodiment illustrated in FIG. 5, the fluid return line 165 is connected to the feed line 225 at a location just downstream of the point at which the supply line 160 is connected. By connecting the supply and return lines in this fashion, one can ensure that there is minimal impact on the original designed water flow rates for the HRSG.

Also, because the fluid is being drawn from the low pressure portion of the HRSG, the physical strength and safety requirements for the supply line 160, the return line 165, the circulation pump 159 and the control valve 157 can be kept to a minimum. If fluid was drawn from the intermediate pressure or high pressure portions of the HRSG, these elements would need to be stronger, and therefore would be more expensive. In addition, routing an intermediate or high pressure fluid back to the preheater 155 or to a heat exchanger 180 would involve additional safety risks to the plant and plant operating personnel that are not present when a low pressure fluid is used.

Figure 6:
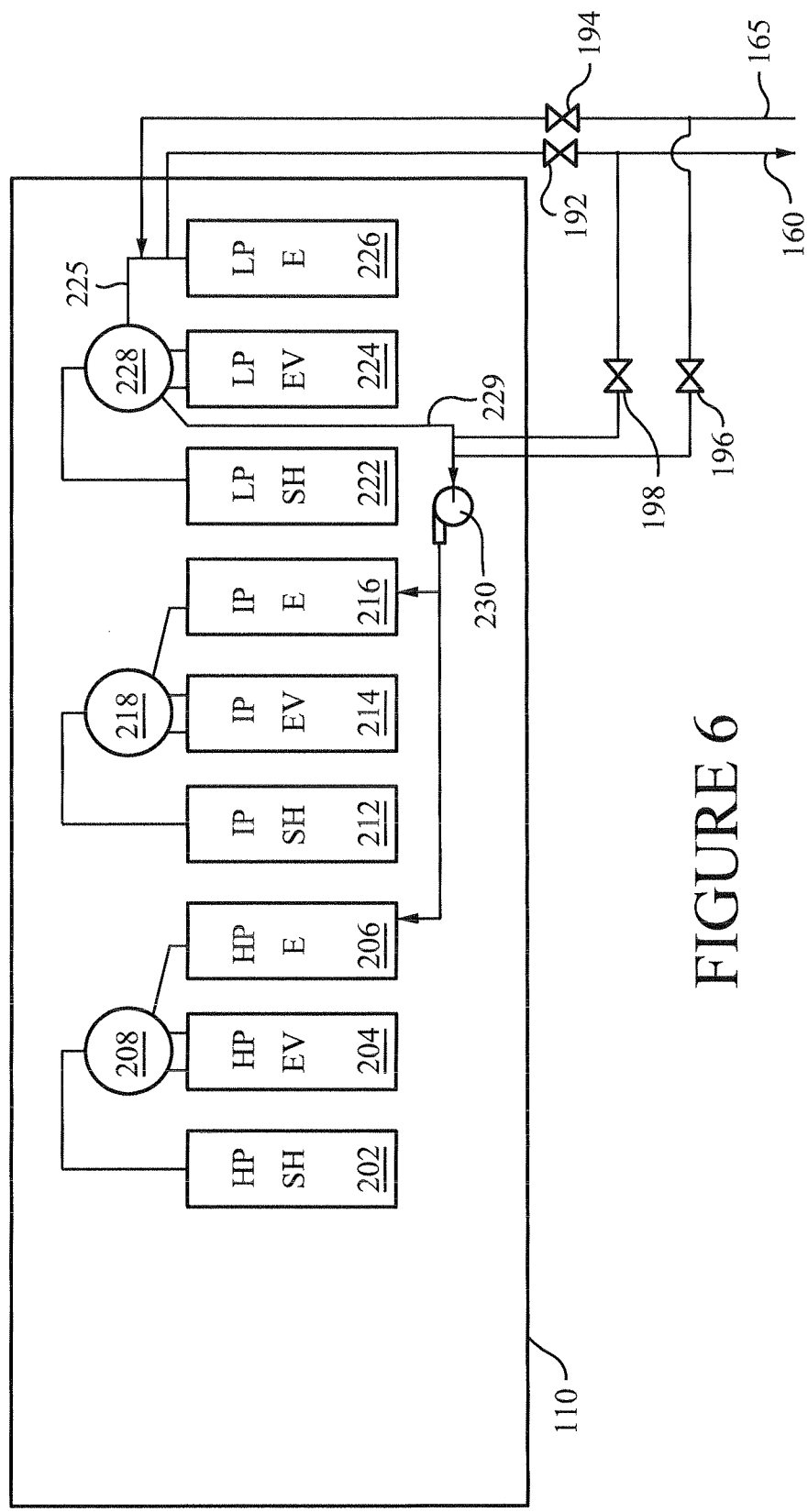
FIG. 6 is a diagram of elements of a third embodiment of a heat recovery steam generator that could be used in a combined cycle power plant.

FIG. 6 illustrates another alternate embodiment. In this embodiment, the supply line 160 is connected to both the feed water line 229 and the feed line 225. Likewise, the return line 165 is also connected to the feed water line 229 and the feed line 225 at positions located just downstream from where the supply line 160 is connected. Valves 192 and 194 are used to selectively couple the supply line 160 and return line 165 to the feed line 225. Also, valves 196 and 198 are used to selectively couple the supply line 160 and the return line 165 to the feed water line 229. Thus, in an embodiment as illustrated in FIG. 6, plant operators can draw fluid from either the feed line 225 or the feed water line 229, as they see fit. Also, if desired, fluid used to heat the inlet-air could be drawn from both the feed line 225 and the feed water line 229 simultaneously. Further, the valves 192, 194, 196 and 198 could be used to vary the relative amounts of fluids being drawn from the feed line 225 and feed water line 229.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for improving the efficiency of a power generation facility, comprising:
    a turbine comprising a compressor which receives inlet-air, a combustion system and a turbine section, wherein the turbine produces an exhaust-gas;
    a heat recovery steam generator (HRSG) which receives a portion of the exhaust-gas and produces steam; and
    a preheater that obtains heat energy from the HRSG and that uses that heat energy to improve the efficiency of the power generation facility, wherein the heat energy obtained from the HRSG is obtained from a fluid drawn from a predetermined point on a feed line within the HRSG, and wherein after heat energy has been extracted from the fluid, the fluid is returned to the HRSG at a location immediately downstream of the predetermined point on the feed line.

2. The system of claim 1, wherein the predetermined point is on a feed water line exiting a drum of the HRSG.

3. The system of claim 1, wherein the predetermined point is on a feed line connecting an economizer of the HRSG to a drum of the HRSG.

4. The system of claim 1, wherein the flow rate of the fluid drawn from the predetermined point within the HRSG is substantially the same as the flow rate of the fluid returned to the location immediately downstream of the predetermined point within the HRSG.

5. The system of claim 1, wherein the preheater uses the heat energy from the HRSG to heat the inlet-air before the inlet-air flows into the compressor.

6. The system of claim 1, wherein the fluid drawn from the predetermined point within the HRSG is drawn from multiple points within the HRSG, and wherein after heat energy has been extracted from the fluid, the fluid is returned to the HRSG at locations immediately downstream of the same predetermined points.

7. A method of improving the efficiency of a power generation facility that includes a turbine having a compressor which receives inlet-air, a combustion system and a turbine section, the turbine producing an exhaust-gas that is at least partially provided to a heat recovery steam generator (HRSG), the method comprising:
    drawing fluid from a predetermined point of a feed line within the HRSG;
    obtaining heat energy from the fluid;
    using the obtained heat energy to improve the efficiency of the power generation facility; and
    returning the fluid to a location immediately downstream of the predetermined point on the feed line within the HRSG after heat energy has been obtained from the fluid.

8. The method of claim 7, wherein the heat energy is used to heat the inlet-air before the inlet-air flows into the compressor.

9. The method of claim 7, wherein the fluid is drawn from and returned to a feed water line exiting a drum of the HRSG.

10. The method of claim 7, wherein the fluid is drawn from and returned to a feed line connected between an economizer of the HRSG and a drum of the HRSG.

11. The method of claim 7, wherein the drawing and returning steps are performed such that a flow rate of the fluid drawn from the predetermined point within the HRSG is substantially the same as a flow rate of the fluid returned to the location immediately downstream of the predetermined point within the HRSG.

12. The method of claim 7, wherein the drawing step comprises drawing fluid from multiple predetermined points within the HRSG, and wherein the returning step comprises returning fluid to locations immediately downstream of each of those predetermined points.

* * * * *